United States Patent [19]

Tejima et al.

[11] Patent Number: 4,736,371
[45] Date of Patent: Apr. 5, 1988

[54] SATELLITE COMMUNICATIONS SYSTEM WITH RANDOM MULTIPLE ACCESS AND TIME SLOT RESERVATION

[75] Inventors: Shunichiro Tejima; Akira Fujii, both of Tokyo, Japan

[73] Assignee: NEC Corporation, Japan

[21] Appl. No.: 947,097

[22] Filed: Dec. 29, 1986

[30] Foreign Application Priority Data

Dec. 30, 1985 [JP] Japan .................. 60-298284
Jan. 20, 1986 [JP] Japan .................. 61-9656
Feb. 27, 1986 [JP] Japan .................. 61-42093
Jun. 30, 1986 [JP] Japan .................. 61-153432

[51] Int. Cl.$^4$ .......................................... H04J 3/16
[52] U.S. Cl. .......................... 370/95; 370/104; 370/94
[58] Field of Search .............. 370/94, 95, 104, 82, 370/83, 84, 89

[56] References Cited

U.S. PATENT DOCUMENTS

| | | | |
|---|---|---|---|
| 4,204,093 | 5/1980 | Yeh .................. | 370/95 |
| 4,322,845 | 3/1982 | Fennel, Jr. et al. .................. | 370/95 |
| 4,491,947 | 1/1985 | Frank .................. | 370/104 |
| 4,538,147 | 8/1985 | Grow .................. | 370/89 |
| 4,612,637 | 9/1986 | Davis et al. .................. | 370/95 |
| 4,641,304 | 2/1987 | Raychaudhuri .................. | 370/95 |

Primary Examiner—Douglas W. Olms
Assistant Examiner—Wellington Chin
Attorney, Agent, or Firm—Laff, Whitesel, Conte & Saret

[57] ABSTRACT

A multiple access data communication system is disclosed wherein a communication channel is shared by a plurality of stations. The channel is divided into frames each being partitioned into time slots smaller in number than the number of stations of the system. A reservation status signal is constantly broadcast at frame intervals from a central station to all remote stations to indicate reserved status of the time slots. When a transmission request is made in a remote station, it discriminates a message signal shorter than the time slot length as a single packet having a time slot length and detects an idle time slot from the channel using the reservation status signal. If the message signal is longer than the time slot length, the station divides it into a series of packets of the time slot length and transmits a reservation request to the central station to receive from it a time-slot assignment signal and inserts the long-message packets to time slots specified by the time-slot assignment signal.

19 Claims, 10 Drawing Sheets

DATA SENT FROM REMOTE STATIONS

DATA SENT FROM REMOTE STATIONS

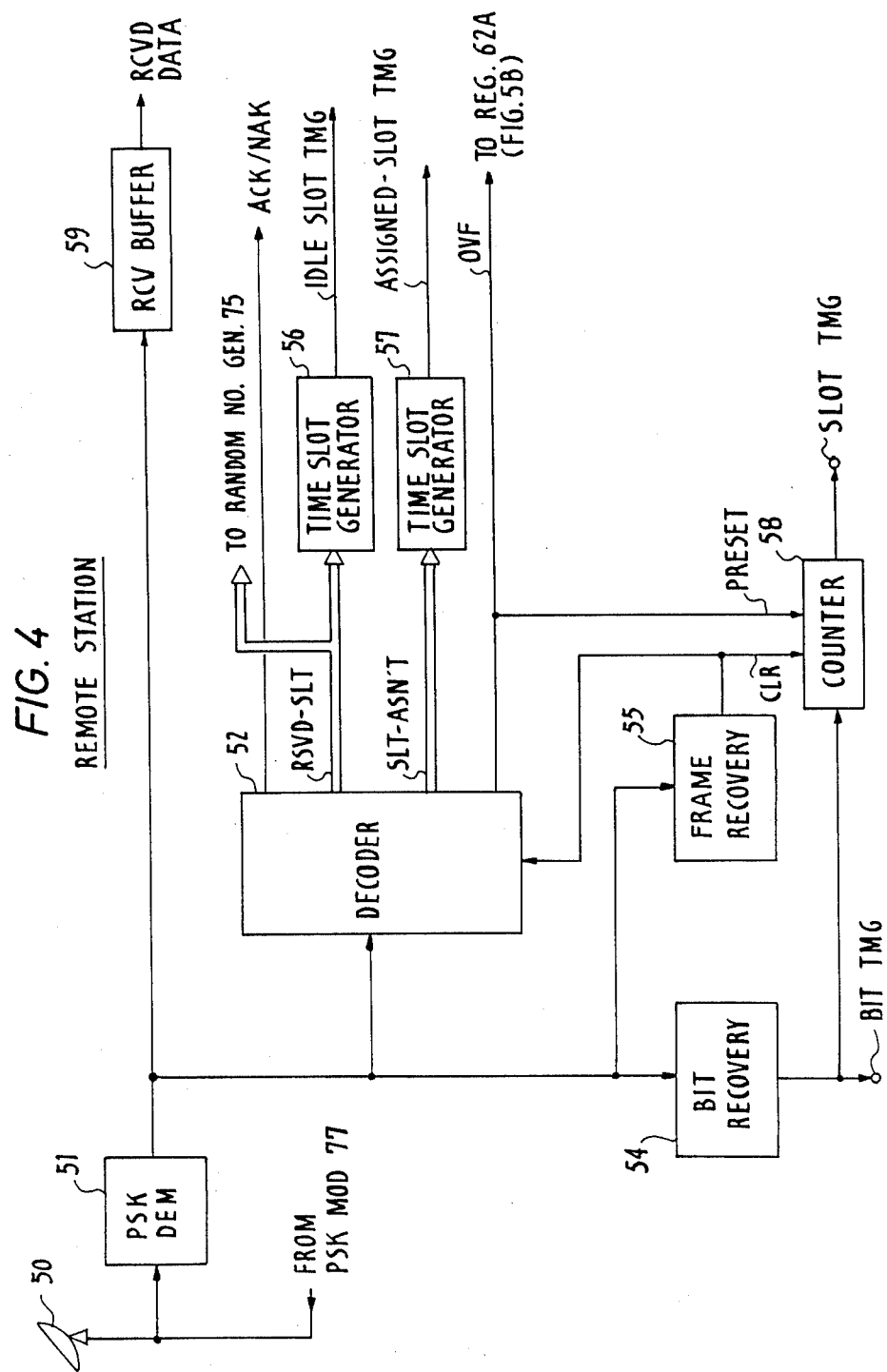

SATELLITE COMMUNICATIONS SYSTEM WITH RANDOM MULTIPLE ACCESS AND TIME SLOT RESERVATION

BACKGROUND OF THE INVENTION

The present invention relates to a time division multiple access data communication system in which a plurality of stations which shares a slotted communication channel through which message signals are transmitted.

The ALOHA system is the first random access multipoint packet data communication system. This system uses a single radio channel which is shared by a plurality of stations or data terminals. Whenever a station generates a packet, which is a message of a fixed length, in the ALOHA system, it transmits the packet on the common radio channel. Since more than one station may attempt to transmit a packet simultaneously, several transmissions may overlap. These overlapping transmissions are said to collide if any portion of two packets overlap. Whenever a collision occurs, random numbers are used to specify a period of time each conflicting station must wait before an attempt is made to gain access to the channel. To reduce increase channel utilization, the slotted ALOHA system was proposed in which the channel is partitioned into slots of time equal to a packet length and each station only transmits a packet at the beginning of a slot. In this way overlapping transmissions are forced to completely overlap. This technique substantially doubles the maximum channel utilization of the unslotted ALOHA system.

Since the slotted ALOHA system still operates on a random access basis, an increase in traffic causes collisions to increase with a resultant increase in retransmissions. Therefore, the total traffic increases disproportionately due to the retransmissions and prevents the channel utilization from reaching its maximum.

To reduce the effects of collisions in the slotted ALOHA system, a slot reservation scheme has been proposed. In this system, the channel is partitioned into frames each containing a reservation slot for transmitting a reservation packet and data slots for transmitting data packets. Each station transmits a reservation packet on a random access basis requesting slots as many as required for data packets to be transmitted. If the request is granted, data slots of a subsequent frame are assigned to the requesting station, which in turn transmits data packets on the assigned slots.

Because of the neccessity of the packet reservation system to transmit a reservation packet prior to the transmission of data packets, there is a delay before the data packets are actually sent. If short messages are dominant in the traffic, the amount of delay would become substantial and satisfactory channel utilization is not attained.

SUMMARY OF THE INVENTION

It is therefore an object of the present invention to provide a multiple access data communication system having a high degree of channel utilization. Briefly described, the object of the present invention is achieved by combining a random access technique for transmission of short message signals with a slot reservation technique for transmission of long message signals.

More specifically, the multiple access data communication system of the present invention has a communication channel for interconnecting a plurality of stations. The channel is divided into frames each having a predetermined number of time slots of equal length for transmitting message signals, the number of such time slots being smaller than the number of stations of the system. In the data communication system, a reservation status signal is constantly broadcast at frame intervals, indicating reserved status of the time slots, to permit a message signal to be transmitted on a random access basis. When a request for transmission is made from a station, a message signal shorter than the time slot length is discriminated as a single packet having a time slot length and a message signal longer than the time slot length is divided into a series of packets of the time slot length. When the message signal is discriminated as a single packet the requesting station detects an idle time slot from the communication channel using the reservation status signal and inserts the discriminated single packet to the detected idle time slot. When the message signal is longer than the time slot length, the requesting station transmits a reservation request to a central station to receive from it a time-slot assignment signal which specifies time slots to be assigned to the requesting station and inserts the long-message packets to the specified time slots.

To reduce the amount of delay involved in transmitting long message signals, a foremost one of the series of packets and the reservation request signal are inserted to a detected idle time slot and the remainder packets of the series are inserted to the time slots specified by the time-slot assignment singal.

A further improvement in channel utilization is achieved for a traffic carrying a large volume of short message signals by detecting when the total traffic volume of packets in the system exceeds a predetermined level, broadcasting a traffic overflow signal in response to the detection of the excessive traffic volume, and causing the length of each time slot to be decreased in response to the traffic overflow signal. Alternatively, channel utilization for dominant short messages can further be improved by detecting a traffic volume of single packets of a station exceeding a predetermined level, causing a reservation request signal to be transmitted in response to the detection of the excessive traffic volume and switching the operational mode of the station by inserting each single packet and a series of packets to the time slots specified by the time-slot assignment signal which is broadcast in response to the reservation request signal. Alternatively, the same improvement can be achieved by broadcasting a negative acknowledgement signal when there is an error in a received single packet and inserting each single packet and the series of packets to the time slots specified by a time-slot assignment signal when the negative acknowledgement signal is broadcast.

The present invention is particularly advantageous for multipoint data communication systems which use a satellite transponder as a transmission medium and further advantageous for a system in which the communication channel interconnects a central station which transmits signals on a broadcast mode to a plurality of remote stations to broadcast reservation status signals at constant intervals and a time-slot assignment signal in response to a reservation request from a remote station.

BRIEF DESCRIPTION OF THE DRAWINGS

The present invention will be described in further detail with reference to the accompanying drawings, in which:

FIG. 4 is a block diagram of a portion of each remote station according to the present invention;

DETAILED DESCRIPTION

Figure 1:
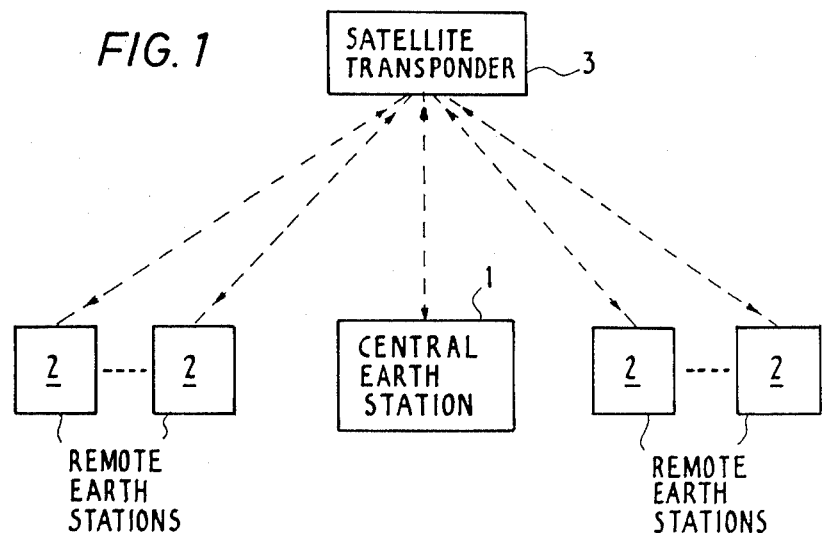
FIG. 1 is a schematic block diagram of a multiple access satellite communications system suitable for application of the present invention.

As schematically represented in FIG. 1, the multiple access satellite communications system of the invention has a central earth station 1 in which a central data terminal equipment is installed and a plurality of remote earth stations 2. Each remote earth station serves one or more data terminal equipments, not shown, from which it receives message signal and sends it in short bursts on time slots defined by the central station through a commonly shared channel to a satellite transponder 3. After amplification, the transponder 3 sends it to the central station 1 where it is processed by the central data terminal equipment and sent back to the transponder 3 where it is broadcast to all the remote earth stations. As described below, the signal from the central station is broken into frames each comprising a control field and a data field in which the processed signal is carried and continuously broadcast through the transponder 3 to allow all remote stations to obtain necessary information from the control field at any instant of time whenever it receives a request for transmission of a message signal from the own data terminal equipment.

According to the present invention, the remote earth stations 2 transmit data to the central station 1 on a randomly selected idle time slot if the length of the data is smaller than the length of time slot and divide longer-than-a-time-slot data into a plurality of packets of time slot length and transmit the foremost of the packets to the central station 1 in a random access mode with a reservation request subfield appended to it to request reservation for the remainder packets. If the request is granted by the central station, idle time slots are selected from nonreserved time slots and assigned to the requesting station for transmission of the remainder packets.

Figure 2A:
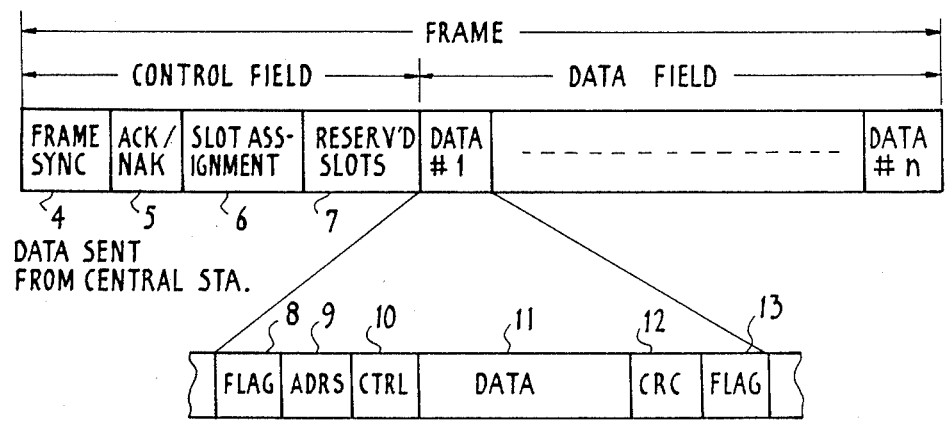
FIG. 2A is an illustration of a data format employed by the central station of FIG. 1
Figure 2B:
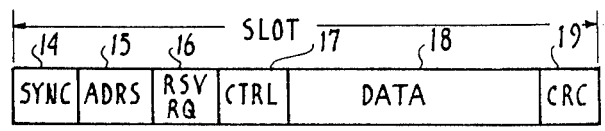
FIG. 2B is an illustration of a data format employed by the remote stations.

FIG. 2A shows a format of data transmitted by the central station 1. As illustrated, signals are transmitted in a series of frames each containing a control field and a data field. The control field comprises a plurality of subfields including a frame sync subfield 4, positive or negative acknowledgement subfield 5, a slot assignment subfield 6 indicating assigned time slot numbers and a code identifying the remote station requesting reservation to which the time slot numbers are to be assigned, and a reserved-slots information subfield 7 which indicates the status of all time slots. Acknowledgement subfield 5 comprises bits which respectively correspond to different time slots. If no error occurs in data received on a given time slot, the bit position corresponding to the given time slot is set to "1" indicating positive acknowledgement (ACK). If error occurs in the received data, the corresponding bit position is set to "0" indicating negative acknowledgement (NAK). The data field contains a number of data packets each having a flag subfield 8 indicating the starting point of the data packet, an address subfield 9 which identifies a receiving remote station, a control subfield 10, a data subfield 11 in which the data to be sent to the receiving station, a cyclic redundancy check subfield 12 and a flag subfield 13 indicating the ending point of the data packet. If the data field is not occupied by data packets, vacant spaces are filled with flag sequences. FIG. 2B is an illustration of a data format for the remote stations. Each remote station transmits a time-slot length packet including a control field containing a sync subfield 14, an address subfield 15 identifying the transmitting remote station, a reservation request subfield 16 indicating the number of packets to be assigned, a control subfield 17, a data subfield 18 containing data to be processed by the central data terminal equipment of the central station and a cyclic redundancy check subfield 19.

Figure 3:
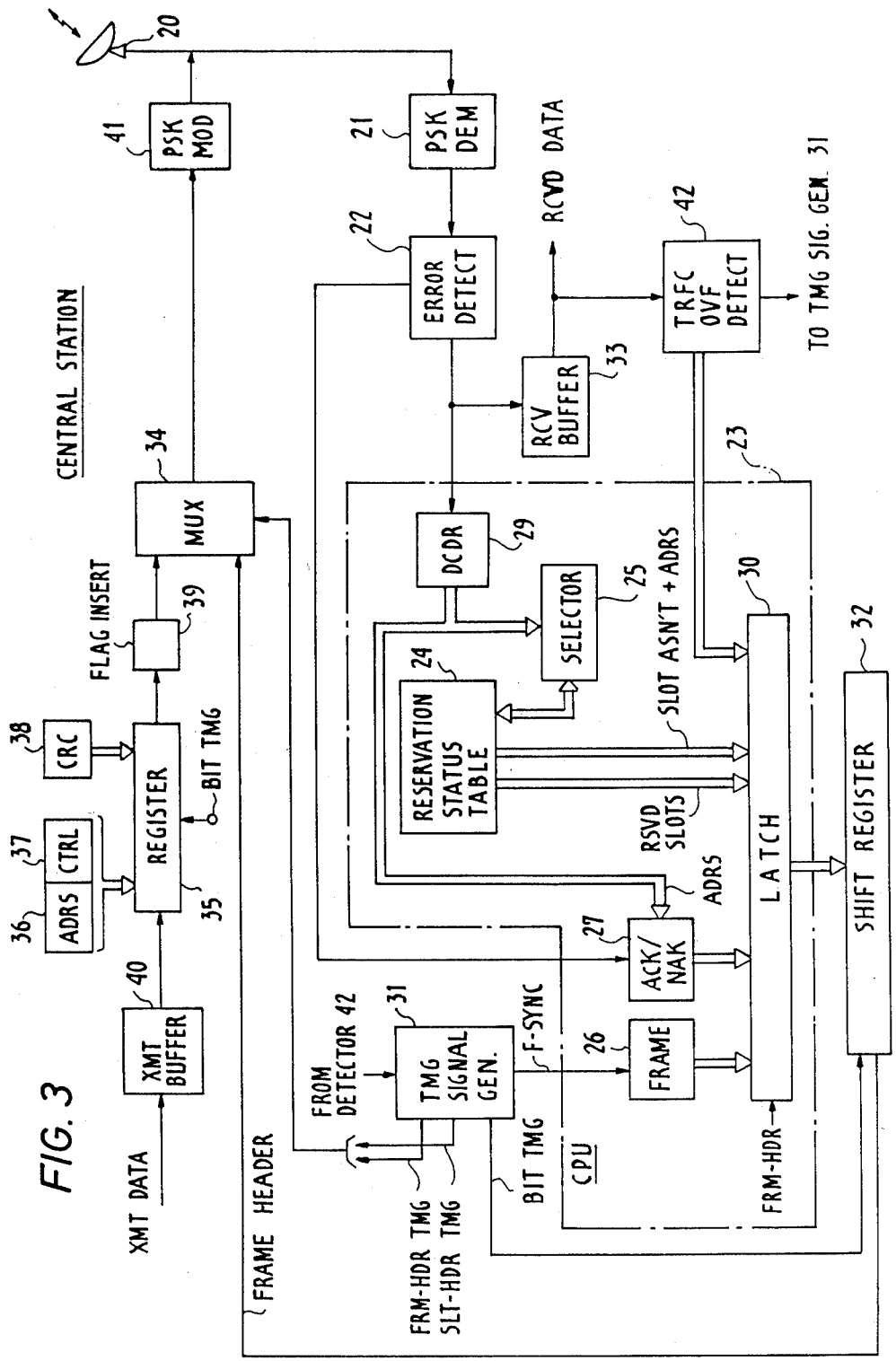
FIG. 3 is a block diagram of the central station.

FIG. 3 shows a block diagram of the central earth station 1. Signals transmitted from the satellite transponder 3 are received by an antenna 20 and passed through a PSK (Phase Shift Keying) demodulator 21. After appropriate amplification and frequency conversion, the demodulated signal is supplied to an error detect circuit 22. If no error is detected in the received data, detector 22 passes it to a decoder 29 of a central processing unit (CPU) 23 and to a receive buffer 33. The output of receive buffer 33 is coupled to an input of a central data processing equipment, not shown, which operates in response to the time-slot sync contained in the time slot data received from the remote stations. Simultaneously, detector 22 causes a positive acknowledgement (ACK) to be supplied to a latch 30 from an ACK/NAK generator 27. Decoder 29 decodes the header field of the received time slot data including the reservation request, the address of a transmitting remote station and data contained in the control subfield 17. Decoder 29 supplies the address of the transmitting remote station to ACK/NAK generator 27 to permit it to distinguish the ACK/NAK subfield addressed to it from those directed to other remote stations. The CPU 23 includes a reservation status table 24 which stores reserved time slot numbers. If a reservation request is received from a remote station, a selector 25 reads the output of decoder 29 to select next available time slots from the reservation status table 24 as many as requested by the remote station and updates the table 24 with the newly selected time slot numbers. Data indicating the selected time slot numbers and the address of the remote station requesting the reservation are read out of the table 24 and a slot-assignment signal indicating the time slots to be assigned to it and the station address information are supplied to latch 30. The stored time slot data, thus updated by selector 25, is also supplied to latch 30 as a signal indicating a list of all the reserved time slots. As will be described later, the reserved time slot signal is used in each remote earth station 2 to generate an idle-slot timing signal when a data packet is to be sent to the central station in a random access mode. If an error is detected in the received data, detector 22 disables its data output to decoder 29 and buffer 33 and causes a negative acknowledgement (NAK) to be supplied from ACK/NAK circuit 27 to latch 30.

A timing signal generator 31 generates a plurality of timing signals including a frame sync, frame-header timing and slot-header timing signals, and bit timing signal. A frame pattern generator 26 is responsive to the frame sync to generate a frame sync pattern which is stored into latch 30. Latch 30 responds to the frame-header timing signal by transferring the stored data to a shift register 32 which is clocked out in response to the bit timing signal from the timing generator 31, thus generating a control field, FIG. 2A. This control field data is supplied to a time division multiplexer 34. A data field is generated by a circuit including a register 35, address and control subfield generators 36 and 37, a CRC (cyclic redundancy check) subfield generator 38, and a flag inserter 39. Address and control subfield generators 36, 37 supply address and control subfields of a receiving remote station to the register 35 and CRC subfield generator 38 supply a CRC code to the register 35. Register 35 is clocked by the bit timing signal to interleave the stored header and trailer subfield data with transmit data supplied through the transmit buffer 40. Flag inserter 39 is coupled to the output of register 35 to insert a flag sequence at the starting and closing ends of each data packet whenever there is information to be sent. If there is no information in the register 35, the flag inserter 39 operates to fill the vacant spaces with flag sequences. Time division multiplexer 34 is timed with the frame-header and slot-header timing signals to multiplex each time slot data with the control field data. The multiplexed signal is modulated upon a carrier by a PSK modulator 41 and sent to the antenna 20 after appropriate amplification and frequency conversion for transmission to satellite transponder 3. The central station 1 may include a traffic overflow detector 42 connected to the output of receive buffer 33 to supply overflow data to latch 30 if the traffic of the time slot data received from all the remote stations exceeds a predetermined level. In such events, a traffic overflow subfield is included in the control field.

FIG. 4 is a block diagram illustrating a portion of each remote earth station. In each remote station, the PSK-modulated signal broadcast by transponder 3 is received by an antenna 50 and, after appropriate amplification and frequency conversion, passed through a PSK demodulator 51 to a decoder 52. The output of PSK demodulator 51 is also applied to a bit recovery unit 54 and a frame recovery unit 55. Decoder 52 responds to a frame timing signal from the frame recovery unit 55 to decode the control field data into individual subfields including ACK/NAK, reserved time slots, slot assignment and traffic overflow. Time slot generators 56 and 57 are connected to the decoder 52 to respond respectively to the subfield data indicating reserved time slots and the slot assignment subfield data by generating an idle-slot timing signal and an assigned-slot timing signal. A presettable counter 58 is connected to the output of bit recovery unit 54 to start counting the recovered clock bits following a clear pulse supplied from the frame timing signal until a preset count is reached. Under normal traffic conditions, the counter 58 is preset to a higher value to generate a slot timing signal that occurs at normal intervals. If a traffic overflow occurs, the counter 58 is preset to a lower value to generate a slot timing signal at one-half the normal intervals. The output of PSK demodulator 51 is further applied to a receive buffer 59 to detect the data field from each frame for application to the data terminal equipment of the remote station.

Figure 5A:
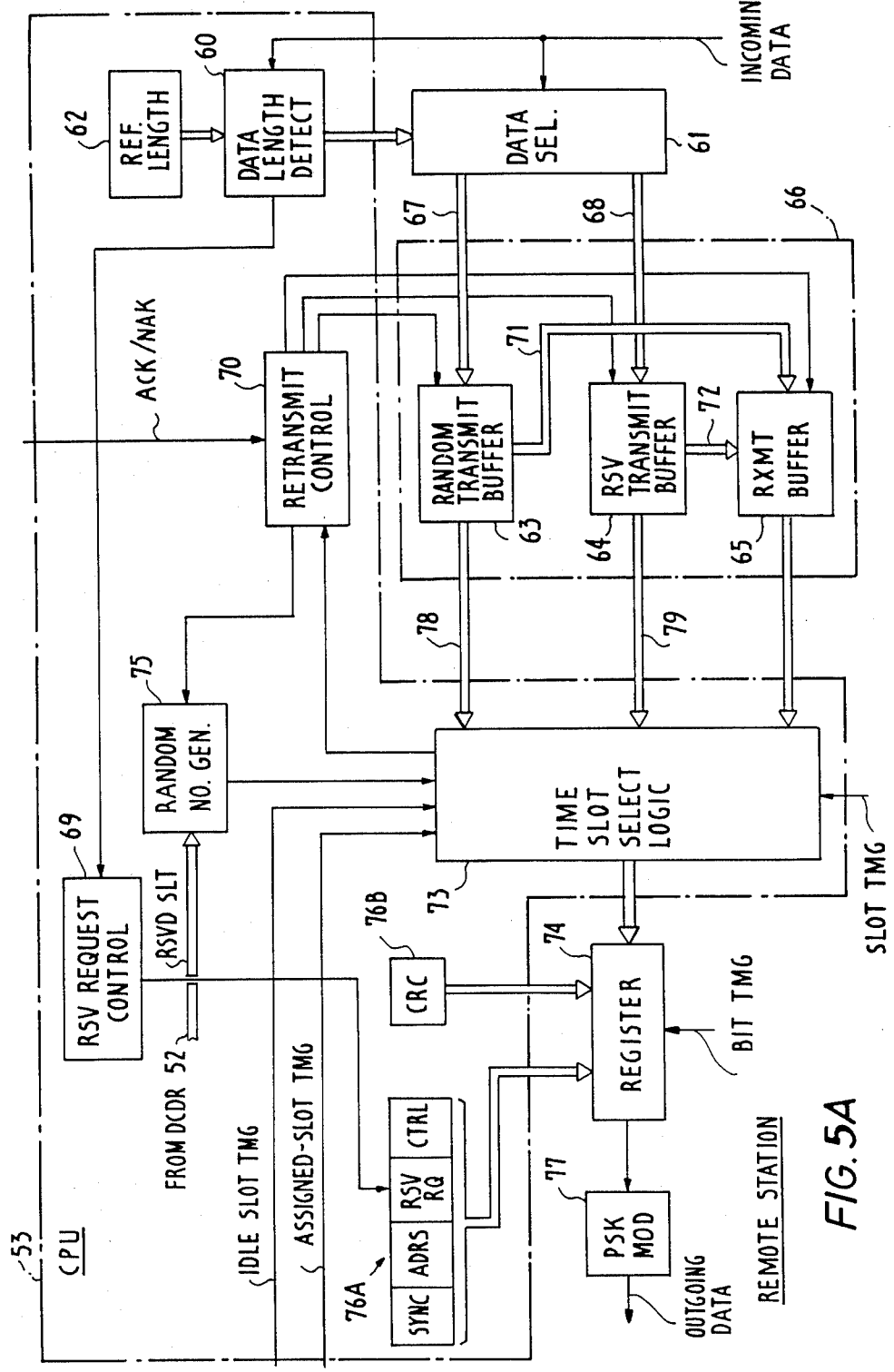
FIG. 5A is a block diagram of the remainder of each remote station according to a first embodiment of the present invention.

FIG. 5A is a block diagram of the remainder portion of the remote station according to a first embodiment of the present invention. Incoming data from the data terminal equipment of the own station is entered to a data length detect logic 60 of the CPU 53 and to a data selector 61. Data length detect logic 60 compares the length of the incoming message data with a reference length, or one time-slot length, from a register 62 and instructs the data selector 61 to pass the incoming data on bus 67 to a random transmit buffer 63 of a memory unit 66 if it is equal to or smaller than one time-slot length. Alternatively, the data length detect logic 60 instructs the data selector 61 to divide the incoming data into several packets each having a length equal to or smaller than a time-slot length and pass the foremost packet on bus 67 to the random transmit buffer 63 and the remainder packets on bus 68 to a reservation transmit buffer 64. In the latter case, the data length detect logic 60 instructs a reservation request control logic 69 to generate a reservation request field to be appended to the foremost packet that has been stored into the random transmit buffer 63. A retransmit control logic 70 is responsive to an ACK/NAK signal from decoder 52 to effect the transfer of a packet from random transmit buffer 63 on bus 71 to a retransmit buffer 65 or effect the transfer of packets from reservation transmit buffer 64 on bus 72 to retransmit buffer 65. The data stored in buffers 63, 64 and 65 are selected by a time-slot select logic 73 and passed to a register 74 during a time slot selected in a manner as will be described. Simultaneously with the transfer of packets from buffers 63, 64 to buffer 65, the retransmit control logic 70 controls a random number generator 75 to randomly select an idle time slot. Specifically, random number generator 75 is connected to the decoder 52 to receive the reserved-slot data to determine idle slots and randomly select one from the determined idle slots. The idle-slot timing and assigned-slot timing signals from the decoder 52, FIG. 4, are supplied to the time-slot select logic 73 to determine a time slot to which one of the outputs of memory 66 is inserted for coupling to the register 74.

Retransmit control logic 70 essentially comprises a comparator and memories. The comparator checks to see if the ACK/NAK signal from the decoder 52 has a "0" (ACK) or "1" (NAK) in the bit position corresponding to the time slot number by which the data packet has been sent. If ACK/NAK is "1", the data packet which has been transferred to the retransmit buffer 65 is cleared. If ACK/NAK is "0", the retransmit control logic 70 enables the random number generator 75 to randomly select an idle time slot and retransmit a packet from the retransmit buffer 65.

The CPU 53 includes a control field generator 76A including sync, address, reservation request and control subfields. The reservation request subfield is controlled in response to an output from the reservation request control logic 69. Further provided is a CRC subfield generator 76B. Register 74 is loaded with the contents of the subfield generators 76A and 76B to form a control field which is clocked out in response to bit timing signal to a PSK modulator 77, the control field being followed by a packet carried on a time slot selected by the time-slot select logic 73. The output of PSK modulator 77 is connected to the antenna 50 after appropriate amplification and frequency conversion for transmission to the satellite transponder 3.

Figure 6A:
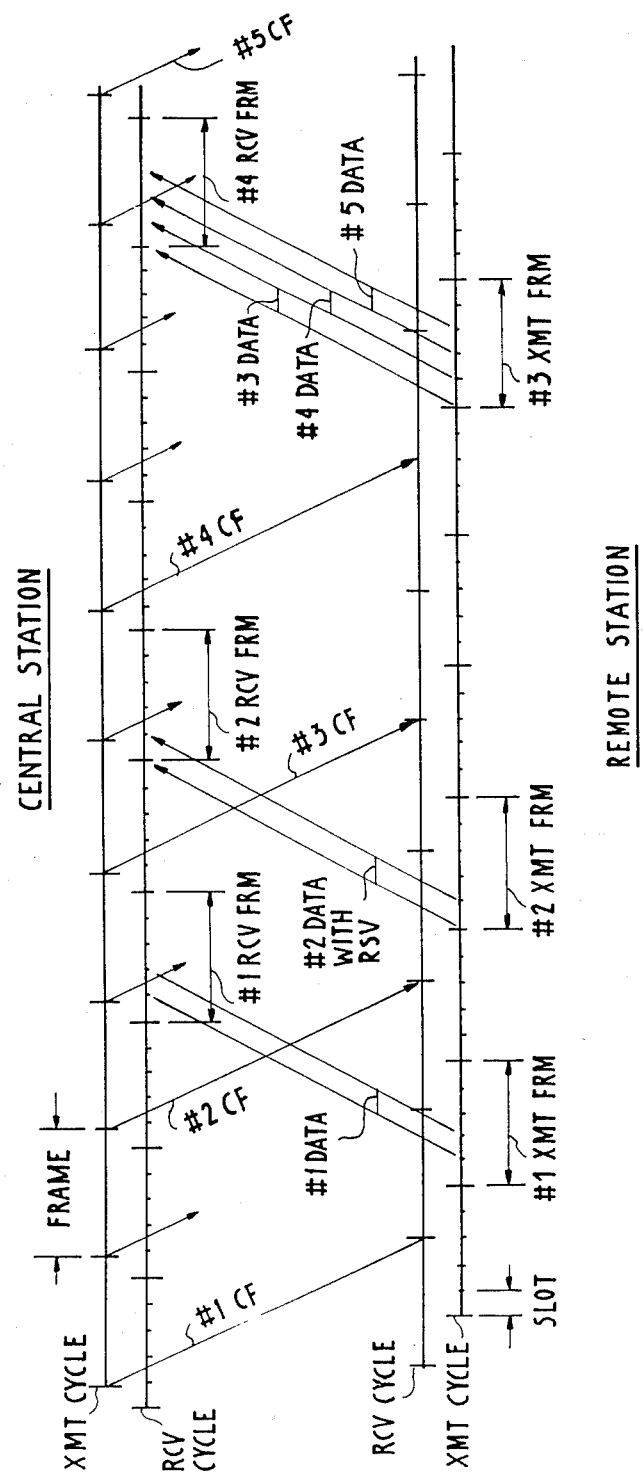
FIGS. 6A, 6B, 6C and 6D are views illustrating the operations of the first, second, third and fourth embodiments of the invention, respectively.

The operation of the first embodiment of the present invention will be described with reference to FIG. 6A. For convenience it is assumed that a frame comprises five time slots. Central station 1 and all the remote stations 2 operate synchronously as illustrated. Central station 1 is constantly broadcasting control fields (CF) with subsequent data fields at frame intervals to allow remote stations to transmit data packets on synchronized time slots. For purposes of description, control fields which are of interest are designated with numbers #1 through #4 in FIG. 6A. In response to each control field, the counter 58, FIG. 3, of each remote station generates a series of slot timing signals and a transmit frame is formed by every five such slot timing signals. It is shown that #1, #2 and #4 transmit frames are formed respectively in response to corresponding control fields. Likewise, the central station generates a receive cycle in which five time slots constitute a receive frame. Assume that a one-slot length message and a four-slot length message are applied to data length detect logic 60, FIG. 5A, in succession, so that the short length message and the foremost packet of the long-length message are stored into the random transmit buffer 63 in succession as #1 and #2 data packets, respectively, and the remaining data packets following #2 data packet are stored into the reservation transmit buffer 64 as #3, #4 and #5 data packets. At the same time, reservation request control logic 69 is instructed by data length detect logic 60 to update the contents of the reservation request subfield of the time-slot control field 76A to append to #2 data packet a request for reservation of three time slots for #3, #4 and #5 data packets. Time slot generator 56 receives reserved-slot data from decoder 52 which obtains it from the reserved-slots subfield of #1 control field, detects idle time slots from those not reserved by any remote stations and generates idle-slot timing signals corresponding to the detected idle time slots. Assume that the time-slot select logic 73 selects a second time slot from the time slots indicated by the idle-slot timing signals from time slot generator 56. Thus, #1 data packet is sent through bus 78 on the selected #2 time slot to register 74 during #1 transmit frame and transmitted via the satellite transponder to the central station where it is received on #2 time slot of #1 receive frame of the central station. In the remote station, #1 data packet is simultaneously transferred from random transmit buffer 63 to retransmit buffer 65. If the transmitted PSK time slot data encounters no collision with data packets from other remote stations, the ACK/NAK subfield generator 27 of the central station writes a positive acknowledgement into an ACK/NAK subfield which will occur in #3 control field.

In response to #2 control field that occurs during #1 transmit frame of the remote station, the time slot generator 56 receives reserved-slot data from decoder 52 to generate timing signals indicative of idle time slots. Time-slot select logic 73 selects #1 time slot, for example, within #2 transmit frame from those indicated by the idle-slot timing signals. Thus, #2 data packet is transmitted on #1 time slot of #2 transmit frame to the central station. Similar to #1 data packet, #2 data packet is also transferred to the retransmit buffer 65. If #2 data packet is not destroyed by collision, it will be received on #1 time slot of #2 receive frame which is separated by one frame from #1 receive frame, and a positive acknowledgement will be sent on #4 control field. If #1 and #2 data packets have been received correctly by the central station, the retransmit control logic 70 of the transmitting remote station will check the ACK signals with the slot numbers of the packets stored in the retransmit buffer 65 and clears the latter. However, if an NAK signal is contained in one of the #3 and #4 control fields, the retransmit control logic 70 enables the random number generator 75 to randomly select an idle time slot to insert #1 data packet from the retransmit buffer 65 to the idle time slot to effect retransmission. This process is repeated with respect to #2 data packet.

Upon receipt of #2 data packet which is appended with the reservation packet requesting three time slots, the central station's decoder 29 supplies this reservation request to selector 25 to cause it to select idle time slots from the reservation status memory 24 to be assigned to #3, #4 and #5 data packets and generates a slot-assignment signal for these data packets. It is assumed that #1 to #3 time slots are selected and assigned by selector 25 to #3 to #5 data packets. Reservation status memory 24 is then updated with the newly assigned time slots. A control field #4 is generated and transmitted on a broadcast mode to all the remote stations. This control frame includes an address subfield indicating the remote station requesting the reservation, a slot-assignment subfield indicating the time slot numbers 1, 2 and 3 and the identification of the remote station requesting the reservation and a reserved-slot subfield indicating the most recent status of all the time slots.

Upon receipt of the #4 control field, the remote stations other than the station requesting the reservation for #3 to #5 data packets, are now informed of the fact that #1 through #3 time slots have been assigned to that remote station. Thus, if there is any data packet to be sent on a random access basis from such stations, such a packet is transmitted on a time slot other than #1 through #3 time slots. On the other hand, the identification code appended to the slot-assignment data enables the remote station requesting the reservation to exclusively use the assigned time slots by allowing its time-slot select logic 73 to select #3 to #5 data packets from reservation transmit buffer 64 and sequentially inserts these packets to #1, #2 and #3 time slots, respectively. If these data packets are properly received by the central station, the remote station will receive #5 control field which contains positive acknowledgements corresponding in number to the #3, #4 and #5 data packets stored in the retransmit buffer 65. The retransmit buffer 65 will thus be cleared. If any one of these data packets has been destroyed, the retransmit control logic 70 will retransmit the destroyed data packet.

It is seen from the foregoing that since random transmission mode is provided only with respect to short-length messages, the likelihood of packet collision is small and since the foremost packet of a long-length message is transmitted on a random basis to make reservation for the remainder packets, the amount of delay involved with the transmission of long-length messages is smaller than that involved with the conventional slotted ALOHA system.

Figure 5B:
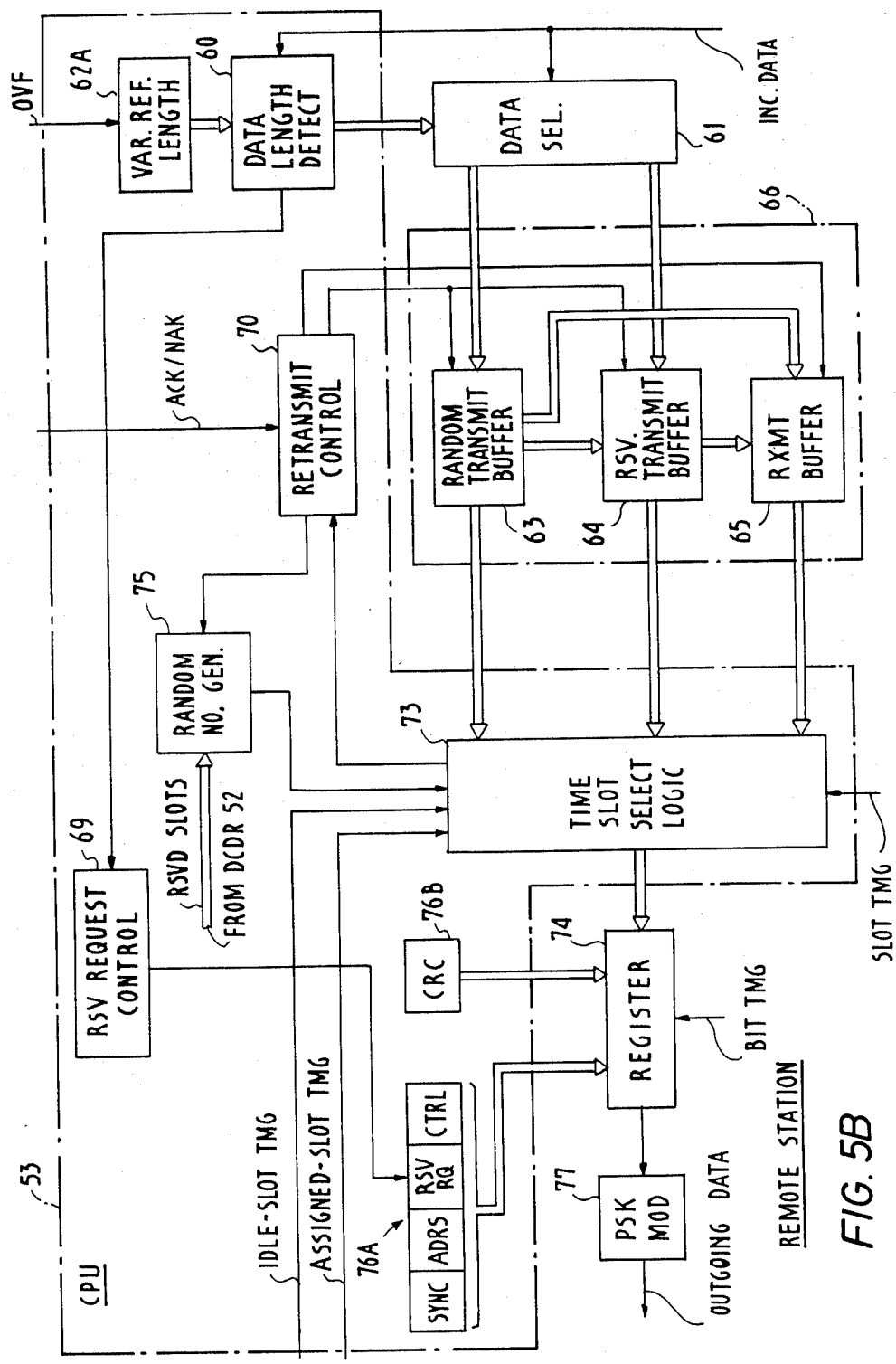
FIG. 5B is a block diagram of the remainder of each remote station according to a second embodiment of the invention.

A second embodiment of the present invention is illustrated in FIG. 5B in which the same numerals are used to indicate parts corresponding to those in FIG. 5A. This embodiment differs from the first embodiment in that it includes a register 62A, instead of register 62, which provides a variable reference data length to data length detect logic 60. Register 62A has an input connected to the decoder 52 to receive the traffic overflow control signal that is received from the central station when the total traffic volume of the satellite communications system exceeds beyond a predetermined level. Under light traffic conditions, the variable reference length is equal to the length as provided by the register 62 of the previous embodiment. When the traffic exceeds the threshold, the traffic overflow signal is applied to the register 62A and to the preset terminal of counter 58, FIG. 4. The variable reference data length is reduced to one half of the normal length and the time slot length is likewise reduced to one half as much. This reduction of the reference length causes data selector 61 to divide messages into packets twice as many as those obtained during light traffic conditions. The increase in the number of such data packets increases the number of packets to be sent in a reservation mode, while increasing the number of time slots available for randomly transmitted packets. This reduces the likelihood of randomly sent data packets being destroyed by collision during heavy traffic conditions.

Figure 6B:
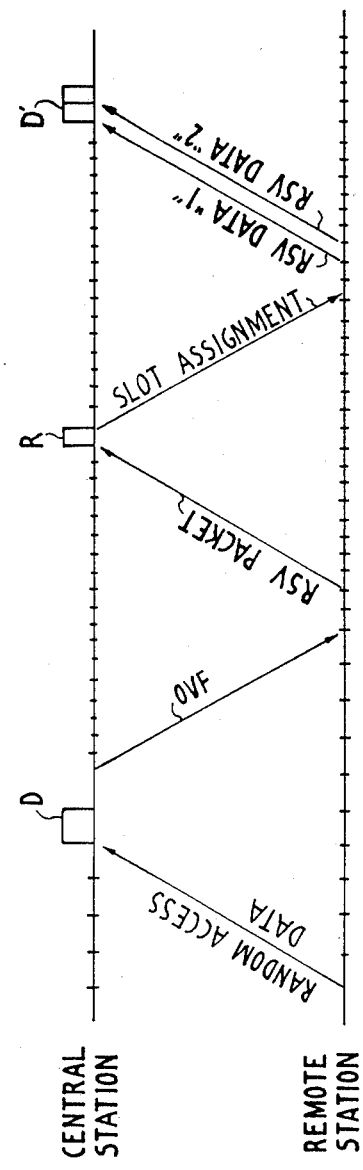

FIG. 6B illustrates the operation of the second embodiment. When traffic overflow occurs following the arrival of a data packet D on a random access basis to the central station, traffic overflow detector 42 of the central station generates a traffic overflow subfield indicating a heavy traffic and causes the timing signal generator 31 to increase the repetition rates of all the timing signals to twice as much. At the same time, the time slot length of the transmitting remote station is reduced to half so that data packet D is divided into two packets D'. Data length detect logic 60 instructs the reservation control logic 69 to generate a reservation packet R in the control field 76A which in turn causes the central station to return a slot assignment signal for reservation of data packets D'.

Figure 5C:
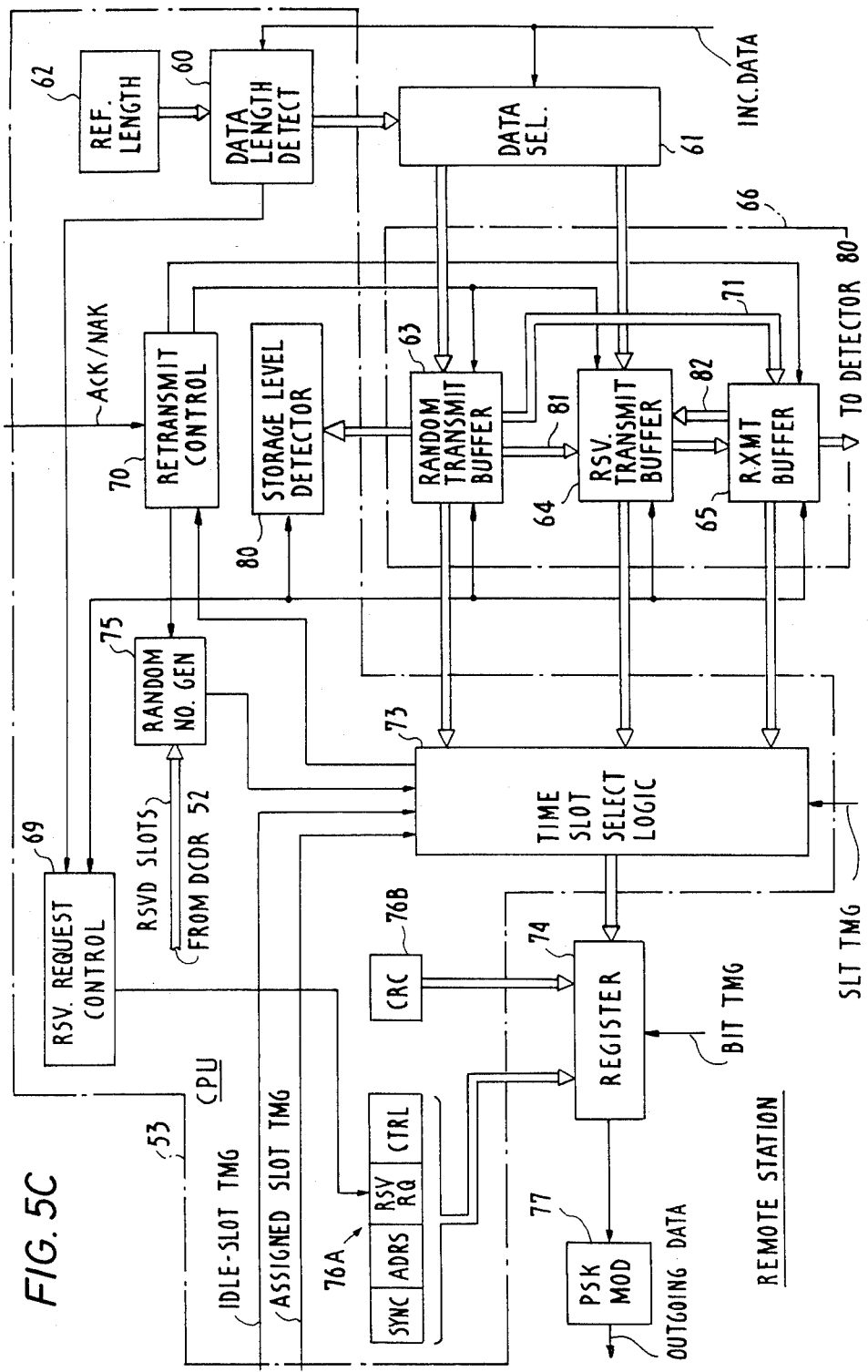
FIG. 5C is a block diagram of the remainder of each remote station according to a third embodiment of the present invention.

FIG. 5C is an illustration of a third embodiment of the invention which is similar to the first embodiment with the exception that a storage level detector 90 is connected to the random transmit buffer 63 and retransmit buffer 65 to detect the amount of traffic being carried in a random access mode to operate the remote station in a reservation mode regardless of the length of data messages supplied to the data selector 61. When the number of short packets stored in buffers 63 and 65 exceeds a predetermined level due to heavy traffic, for example, storage level detector 80 instructs the random transmit buffer 63 and the retransmit buffer 65 to transfer theirpackets to the reservation transmit buffer 64 on buses 81 and 82 and instructs the reservation request control logic 69 to generate a reservation packet in the control field 76A.

Figure 6C:
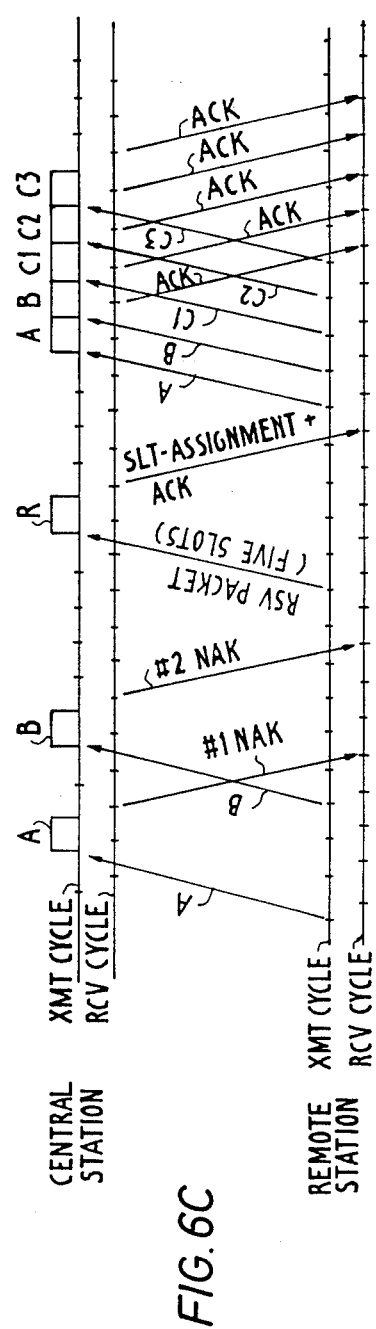

FIG. 6C illustrates the operation of the third embodiment. Assume that small data packets A and B are successively stored into the random transmit buffer 63 and respectively sent on different frames and encounter collisions, resulting in the successive reception of negative acknowledgement #1 and #2 NAKs. If the total storage levels of the random transmit buffer 63 and retransmit buffer 65 exceed a predetermined level, the detector 80 generates an output indicating that the traffic volume of short packets has increased to such an extent that a prohibitively long delay can occur in the transmission of small packets due to retransmission overload. Assume that three short packets C1, C2 and C3 are stored into the random transmit buffer 63 immediately following the transmission of data packet B. Data length detector 60 will cause the reservation request control logic 69 to generate a reservation packet R in the control field 76A requesting a reservation of five packets A, B, C1, C2 and C3. Since packets A and B have been transferred on bus 71 to the retransmit buffer 65, the storage level detector 80 instructs the buffers 63, 64 and 65 to transfer packets A and B from retransmit buffer 64 on bus 82 to reservation transmit buffer 64 and causes packets C1, C2 and C3 to be transferred on bus 81 from random transmit buffer 63 to reservation transmit buffer 64 so that packets A, B, C1, C2 and C3 are arranged in sequence in the buffer 64. If the request for reservation of five packets is granted by the central station, the packets now stored in the reservation transmit buffer 64 will be sent on time slots assigned by the central station. As a precaution against data loss, the packets stored in the reservation transmit buffer 64 are transferred to the retransmit buffer 65. In place of the reservation packet R, data packet A could be transmitted with a reservation request subfield in a manner similar to the first embodiment. The third embodiment is particularly suitable for systems which handles a greater number of small packets than it handles long packets.

Figure 5D:
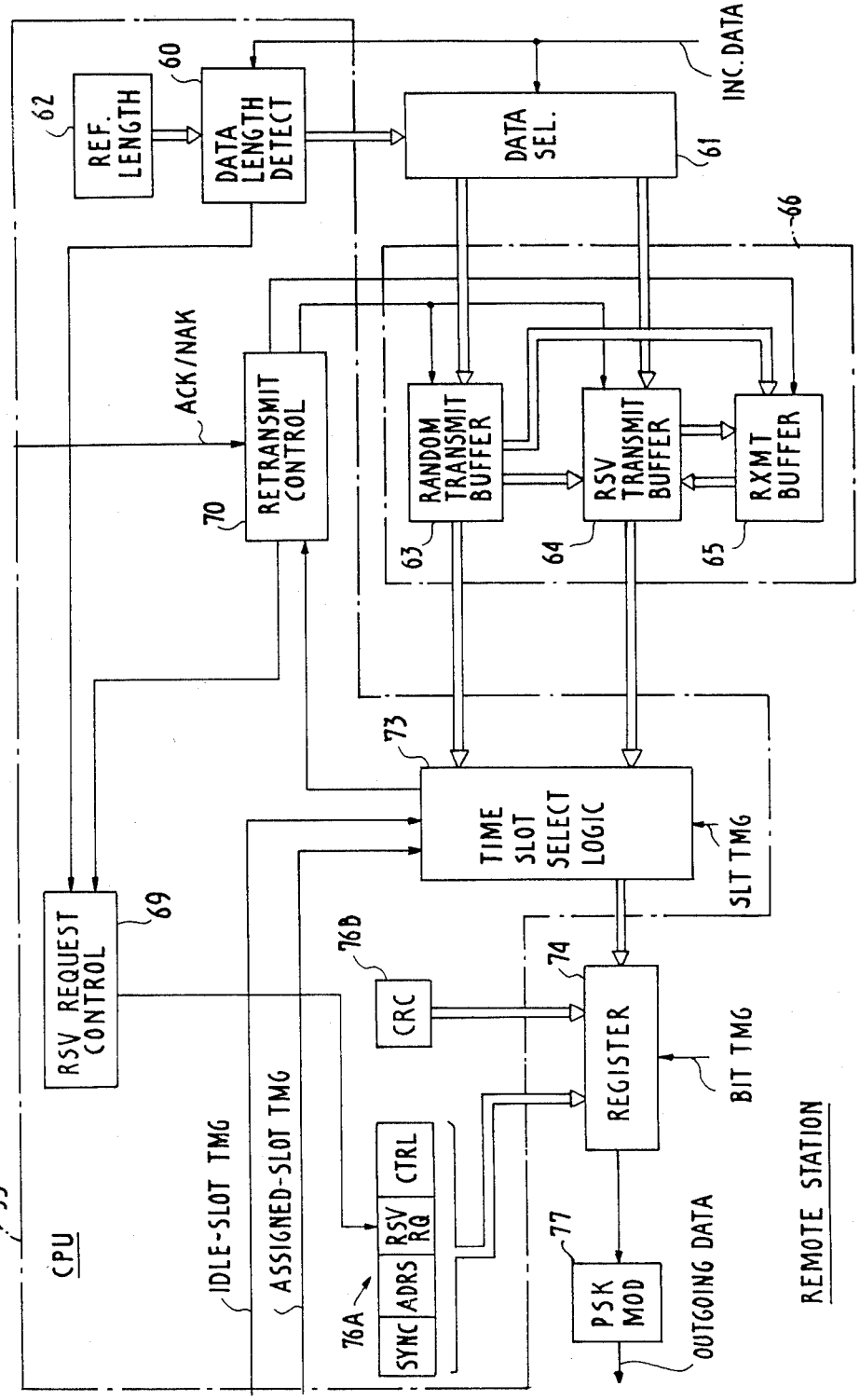
FIG. 5D is a block diagram of the remainder of each remote station according to a fourth embodiment of the invention.
Figure 6D:
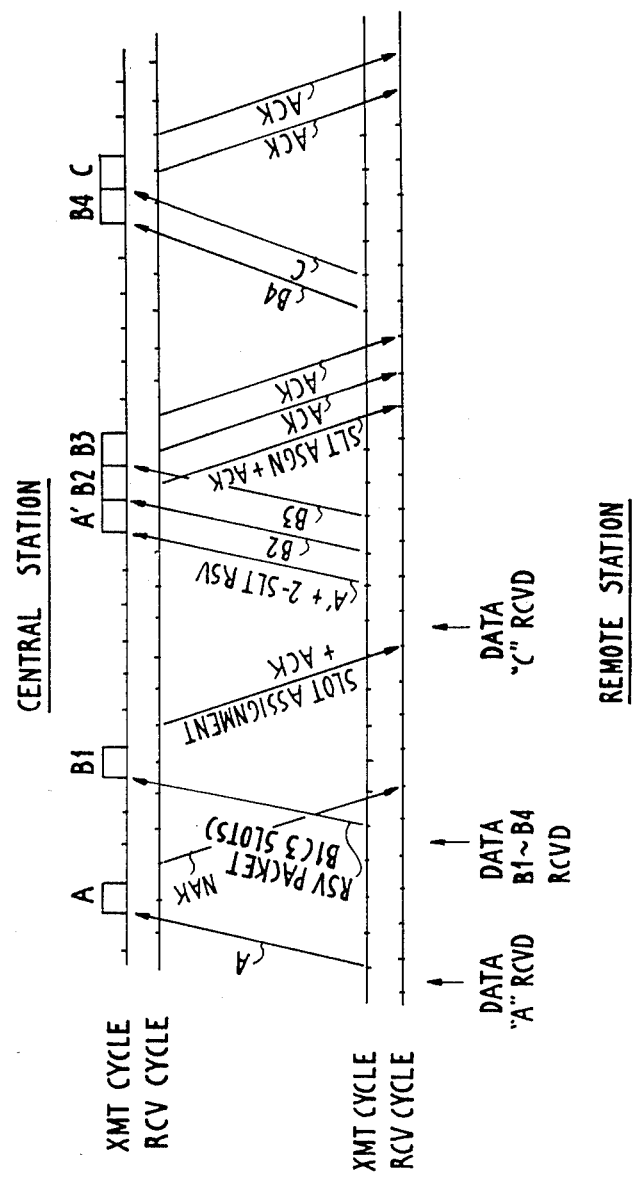

A fourth embodiment of the invention is shown in FIG. 5D which is similar to the third embodiment with the exception that the random number generator 75 and storage level detector 80 are dispensed with and the retransmit control logic 70 responds to a negative acknowledgement NAK by treating it as if it were a traffic overload indication. In FIG. 6D, assume that a short packet A has been sent on a random access mode from a remote station and lost with collision with another data packet and a long data message is divided into packet B1 which is stored into random transmit buffer 63 and packets B2 to B4 which are stored into reservation transmit buffer 64, and packet B1 has been transmitted successfully following the transmission of packet A. The collision of packet A results in the transmission from the central station a negative acknowledgement NAK which is received by the remote station immediately following its transmission of packet B1 with a reservation request subfield appended to it requesting a reservation of three time slots for packets B2, B3 and B4 and which request is assumed to be granted. The negative acknowledgement NAK causes the retransmit control logic 70 to instructs the retransmit buffer 65 to transfer packet A to reservation transmit buffer 64. As a result, the reservation transmit buffer 64 is loaded with packet A', which is the retransmit version of packet A, and packets B2 to B4. If there is a packet C in the random transmit buffer 63 prior to transmission of packet A', this packet will also be transferred to reservation transmit buffer 64. Since three time slots have been assigned in response to the transmission of packet B1, packets A', B2 and B3 are inserted respectively to the assigned time slots. Since two packets B4 and C must be transmitted on a reservation mode, packet A' is appended with a reservation request subfield requesting additional two time slots in response to an instruction given to the reservation request controller 69 from retransmit control logic 70. Thus, packets B4 and C are subsequently transmitted on assigned time slots and successfully received by the central station as indicated.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A multiple access data communication system having a communication channel for interconnecting a central station and a plurality of remote stations, wherein each of said remote stations transmits a message signal on said channel to said central station which broadcasts a return message signal to said remote stations, said communication channel being divided into frames each having a predetermined number of time slots of equal length,
   wherein said central station comprises:
   first means for broadcasting a reservation status signal indicating reserved status of said time slots at frame intervals and a time-slot assignment signal indicating a certain of said time slots to be assigned to one of said remote stations in response to a reservation request signal transmitted therefrom;
   wherein each of said remote stations comprises:
   second means for discriminating a message signal having a length shorter than a time slot length as a single packet having the same length as each time slot and dividing a message signal having a length longer than the time slot length into a series of packets of the time slot length; and
   third means for detecting an idle time slot from said time slots in response to said reservation status signal when said message signal is shorter than the time slot length and inserting said single packet to said detected idle time slot and for transmitting said reservation request signal indicating the number of time slots to be reserved for the packets in said series when said message signal is longer than the time slot length and inserting the packets of said series to the time slots indicated by said time-slot assignment signal.

2. A multiple access data communication system as claimed in claim 1, wherein said third means comprises means for inserting a foremost one of said series of packets and said reservation request signal to said detected idle time slot and inserting the remainder of said series of packets to the time slots indicated by said time-slot assignment singal.

3. A multiple access data communication system as claimed in claim 1, wherein said first means further comprises means for broadcasting a negative acknowledgement signal when there is an error in a received single packet, and said third means further comprises means for randomly selecting an idle time slot from said time slots in response to said reservation status signal when said negative acknowledgement is broadcast and inserting a replica of a previously transmitted packet to the randomly selected time slot.

4. A multiple access data communication system as claimed in claim 1, wherein said first means further comprises:

means for detecting a traffic volume of packets received by the central station exceeding a predetermined level and broadcasting a traffic overflow signal in response to the detection of said exceeding traffic volume,
wherein said second means further comprises:
means for causing the length of each time slot to be decreased in response to said traffic overflow signal.

5. A multiple access data communication system as claimed in claim 1, wherein each of said remote stations further comprises:
means for detecting a traffic volume of said single packets exceeding a predetermined level, causing said reservation request signal to be transmitted in response to the detection of said exceeding traffic volume and inserting said single packet and said series of packets to the time slots indicated by said time-slot assignment signal which is broadcast in response to the last-mentioned reservation request signal.

6. A multiple access data communication system as claimed in claim 1, wherein said first means further comprises means for broadcasting a negative acknowledgement signal when there is an error in a received single packet, and wherein said third means comprises means for inserting said single packet and said series of packets to the time slots indicated by said time-slot assignment signal in response to said negative acknowledgement signal.

7. A multiple access data communication system as claimed in claim 1, further comprising a satellite transponder through which said communication channel is established between said central station and said plurality of remote stations.

8. A multiple access data communication system having a communication channel for interconnecting a plurality of stations, said channel being divided into frames each having a predetermined number of time slots of equal length, comprising:
   first means for broadcasting a reservation status signal indicating reserved status of said time slots at frame intervals and a time-slot assignment signal indicating a certain of said time slots to be assigned to one of said stations in response to a reservation request signal transmitted therefrom;
   second means for discriminating a message signal shorter than the time slot length as a single packet having a time slot length and dividing a message signal longer than the time slot length into a series of packets of the time slot length; and
   third means for detecting an idle time slot from said channel in response to said reservation status signal when said message signal is shorter than the time slot length and inserting said single packet to said detected idle time slot and for transmitting said reservation request signal indicating the number of time slots to be reserved for the packets in said series when said message signal is longer than the time slot length and inserting the packets of said series to the time slots indicated by said time-slot assignment signal.

9. A multiple access data communication system as claimed in claim 8, wherein said third means comprises means for inserting a foremost one of said series of packets and said reservation request signal to said detected idle time slot and inserting the remainder of said series of packets to the time slots indicated by said time-slot assignment singal.

10. A multiple access data communication system as claimed in claim 8, wherein said first means further comprises means for broadcasting a negative acknowledgement signal when there is an error in a received single packet, and said third means further comprises means for randomly selecting an idle time slot from said channel in response to said reservation status signal when said negative acknowledgement is broadcast and inserting a replica of a previously transmitted packet to the randomly selected time slot.

11. A multiple access data communication system as claimed in claim 8, wherein said first means further comprises:
means for detecting a total traffic volume of packets in said system exceeding a predetermined level and broadcasting a traffic overflow signal in response to the detection of said exceeding traffic volume, wherein said second means further comprises:
means for causing the length of each time slot to be decreased in response to said traffic overflow signal.

12. A multiple access data communication system as claimed in claim 8, further comprising:
means for detecting a traffic volume of said single packets exceeding a predetermined level, causing said reservation request signal to be transmitted in response to the detection of said exceeding traffic volume and inserting said single packet and said series of packets to the time slots indicated by said time-slot assignment signal which is broadcast in response to the last-mentioned reservation request signal.

13. A multiple access data communication system as claimed in claim 8, wherein said first means further comprises means for broadcasting a negative acknowledgement signal when there is an error in a received single packet, and wherein said third means comprises means for inserting said single packet and said series of packets to the time slots indicated by said time-slot assignment signal in response to said negative acknowledgement signal.

14. A multiple access data communication system as claimed in claim 8, further comprising a satellite transponder through which said communication channel is established between said stations.

15. A method for assigning time slots in a multiple access data communication system having a communication channel for transmitting a message signal from each of a plurality of remote stations to a central station which in turn broadcasts a return message signal to said remote stations, said communication channel being divided into frames each having a predetermined number of time slots of equal length, the method comprising the steps of:
(a) broadcasting from said central station to said remote stations a reservation status signal indicating reserved status of said time slots at frame intervals and a time-slot assignment signal indicating a certain of said time slots to be assigned to a remote station in response to a reservation request signal transmitted therefrom;
(b) discriminating a message signal as a single packet having the same length as each of said time slots when the message signal is smaller than the time slot length;
(c) dividing the message signal into a series of packets of the time slot length when the message signal has a length greater than the time slot length;
(d) detecting an idle time slot from said time slots in response to said reservation status signal when said message signal is smaller than the time slot length and inserting said single packet to said idle time slot; and
(e) transmitting said reservation request signal indicating the number of time slots required for said series of packets when said message signal is longer than the time slot length and inserting said plurality of packets to the time slots indicated by said time-slot assignment signal.

16. A method for assigning time slots as claimed in claim 15, wherein the step (e) comprises inserting a foremost one of said series of packets and said reservation request signal to said detected idle time slot and inserting the remainder of said series of packets to the time slots indicated by the time-slot assignment signal which is received after the transmission of the last-mentioned reservation request signal.

17. A method for assigning time slots as claimed in claim 15, further comprising the steps of detecting a traffic volume of packets received by the central station exceeding a predetermined level, broadcasting a traffic overflow signal from the central station in response to the detection of said exceeding traffic volume, and causing the length of each time slot in said remote stations to be decreased in response to said traffic overflow signal.

18. A method for assigning time slots as claimed in claim 15, further comprising the steps of detecting a traffic volume of said single packets in each remote station exceeding a predetermined level, causing said reservation request signal to be transmitted in response to the detection of said exceeding traffic volume, and inserting said single packet and said series of packets to the time slots indicated by said time-slot assignment signal which is broadcast in response to the last-mentioned reservation request signal.

19. A method for assigning time slots as claimed in claim 15, further comprising the steps of broadcasting a negative acknowledgement signal from the central station when there is an error in a received single packet and inserting said single packet and said series of packets to the time slots indicated by said time-slot assignment signal in response to said negative acknowledgement signal.

* * * * *